(No Model.) 4 Sheets—Sheet 1.
W. B. PURVIS.
PAPER BAG MACHINE.
No. 519,348. Patented May 8, 1894.
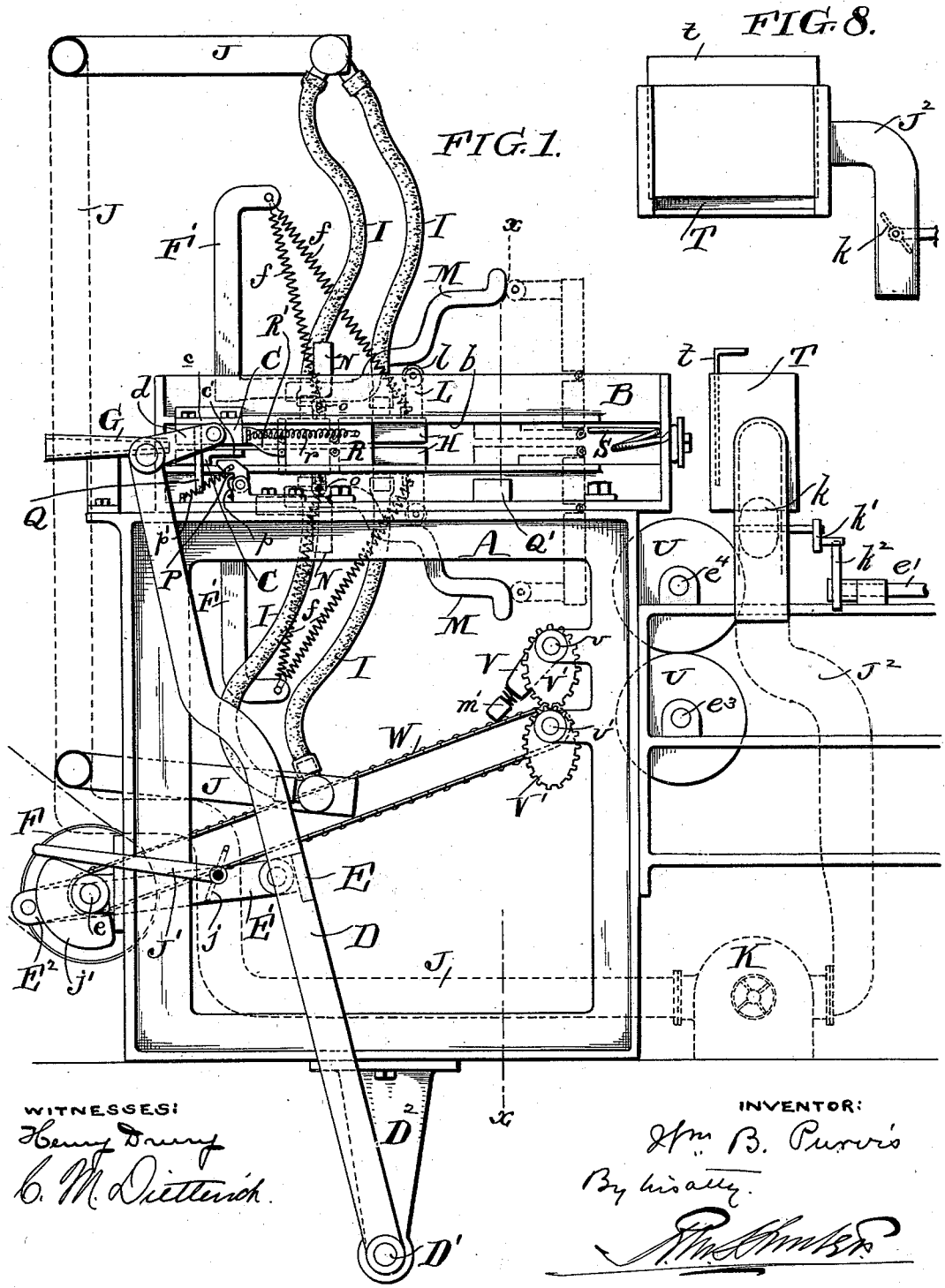
WITNESSES:
Henry Drury
C. M. Dietterich
INVENTOR:
Wm B. Purvis
By his atty.

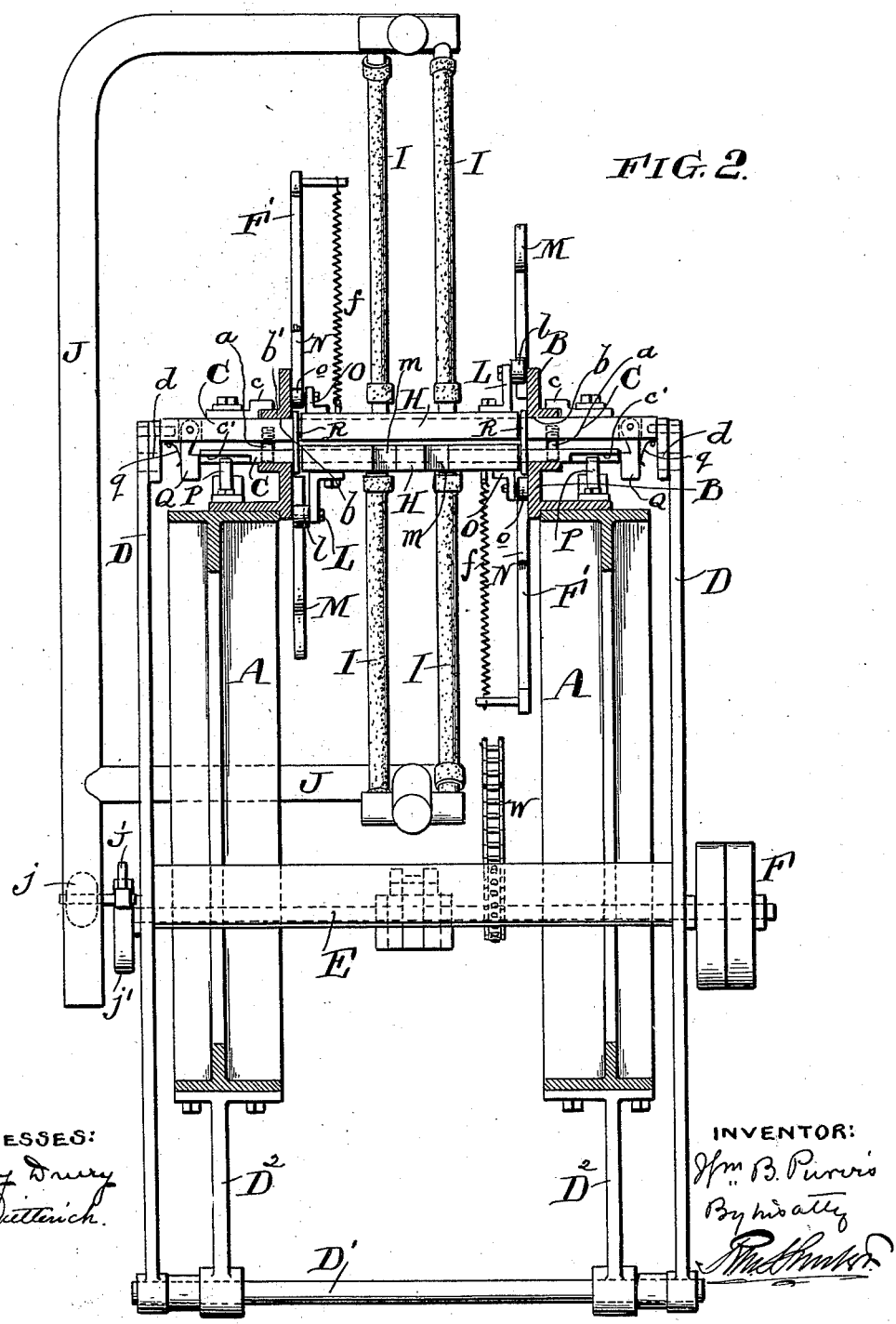

(No Model.) 4 Sheets—Sheet 3.
W. B. PURVIS.
PAPER BAG MACHINE.
No. 519,348. Patented May 8, 1894.
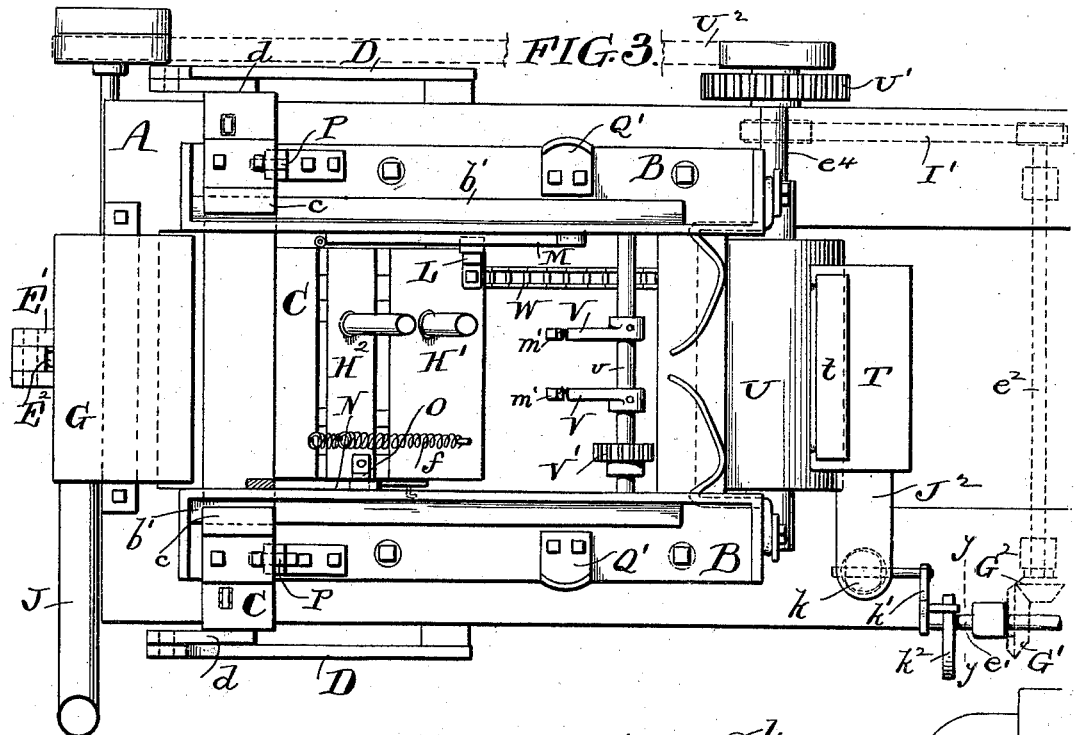
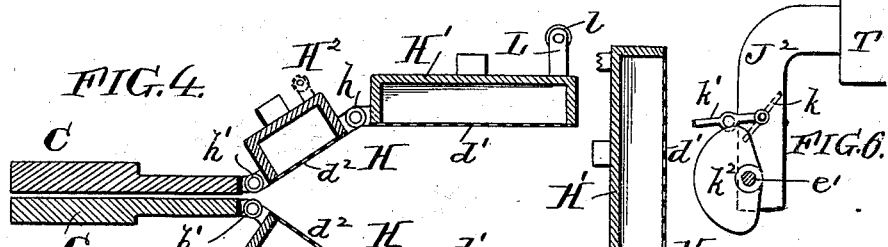
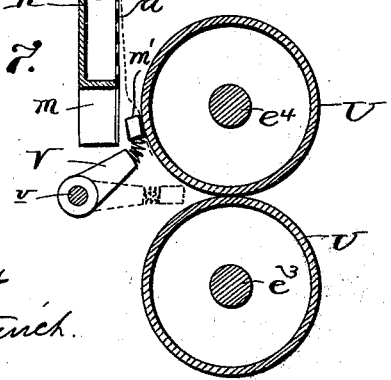
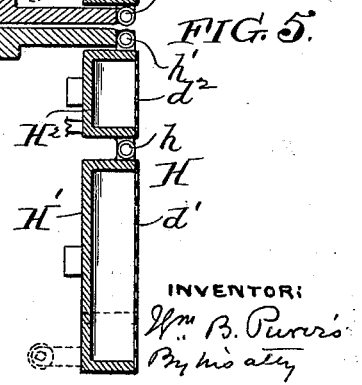
WITNESSES:
Henry Drury
C. M. Dietterich
INVENTOR:
Wm. B. Purvis
By his atty (No Model.) 4 Sheets—Sheet 4.
W. B. PURVIS.
PAPER BAG MACHINE.
No. 519,348. Patented May 8, 1894.
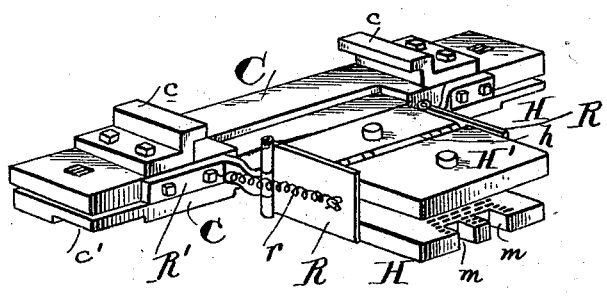
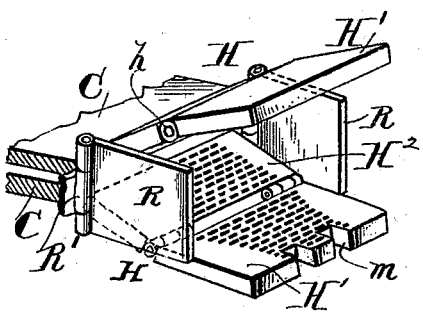
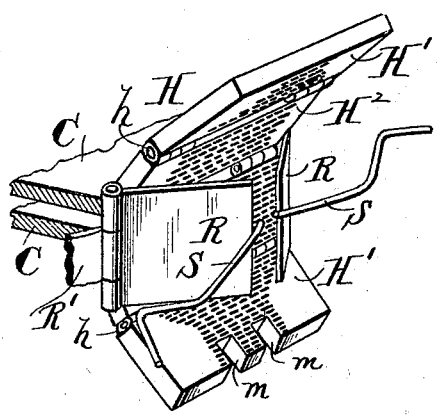
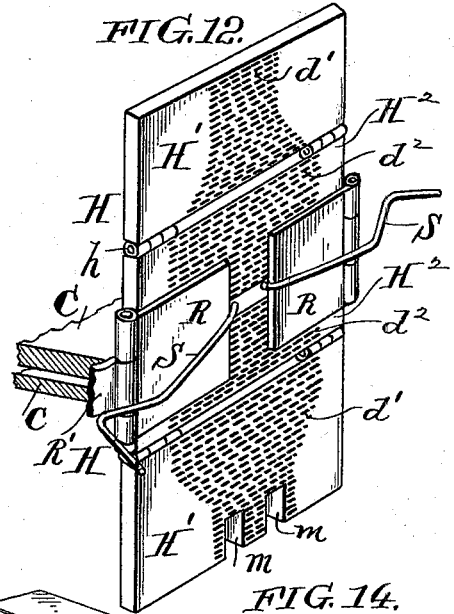
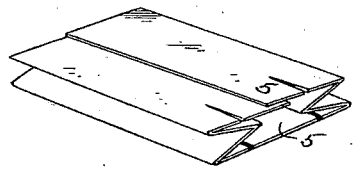
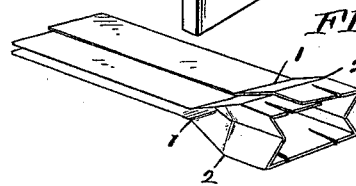
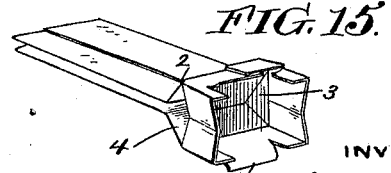
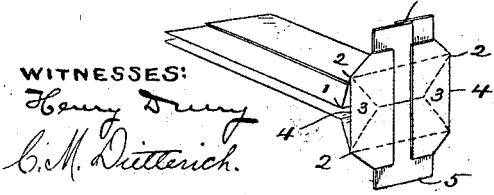
WITNESSES:
INVENTOR:
Wm. B. Purvis

UNITED STATES PATENT OFFICE.

WILLIAM B. PURVIS, OF PHILADELPHIA, PENNSYLVANIA, ASSIGNOR TO THE EASTERN PAPER BAG COMPANY, OF HARTFORD, CONNECTICUT.

PAPER-BAG MACHINE.

SPECIFICATION forming part of Letters Patent No. 519,348, dated May 8, 1894.

Application filed July 23, 1892. Serial No. 441,005. (No model.)

*To all whom it may concern:*

Be it known that I, WILLIAM B. PURVIS, a citizen of the United States, and a resident of the city and county of Philadelphia and State of Pennsylvania, have invented an Improvement in Paper-Bag Machines, of which the following is a specification.

My invention relates to paper bag machines, and consists of certain improvements which are fully set forth in the following specification and are shown in the accompanying drawings which form a part thereof.

My invention relates to machines for forming or folding the ends of paper tubes into the proper folds for making the bottoms of paper bags and is especially concerned with the formation of the folds for making what is commonly known as the satchel square bottomed bag from a bellows side fold tube. The satchel bottom has been formed by means of appropriately constructed suction formers between which the tube sections have been fed by suitable carriers. In the present invention, I employ reciprocating suction formers which are caused to move apart or open up during their reciprocation and thereby break down or form the paper of the tube section carried by them into the proper folds.

In the machine which I have illustrated in the drawings, and which will be hereinafter particularly described, I have shown particular forms of mechanism for causing the proper movements of the suction formers during their reciprocations, but I do not mean to limit my invention to this particular form of mechanism as it may be manifestly varied without making any departure from the invention.

The present invention comprehends broadly the combination of reciprocating suction formers, which carry the tube to be formed, with suitable mechanism for opening up or moving the suction formers away from one another during their reciprocations for the purpose of opening out and forming the paper into the proper folds, as distinguished from a machine in which the tube is carried between the formers and is folded in passing from one portion of the formers to another portion.

The present invention relates only to the devices for forming the tube section into the proper folds for the bottom of the bag, and is not concerned with the apparatus for finally pasting and finishing the bag bottom, for which purpose any of the well known machines may be used as is hereinafter more fully explained.

In connection with my reciprocating suction formers an air blower may be employed for blowing a blast of air into the opened end of the tube to assist the formers in shaping the folds, but this is not essential to my invention.

My invention also relates to devices for imparting an intermittent action to the suction in the formers whereby a slight movement or vibration is imparted to the paper under action and assists materially in breaking it into the proper creases or folds.

Another part of my invention relates to the construction of the formers in sections hinged together whereby different movements may be imparted to the respective sections relatively to one another.

My invention also relates to devices for clamping the tube sections between the formers during the reciprocation thereof and for releasing the tube at the proper time; and to the device for folding in the side folds of the tube, and also to other constructions and combinations of parts hereinafter more fully described and claimed.

I shall now refer to the drawings for the purpose of describing the particular apparatus which I have shown for the purpose of carrying out my invention.

Figure 1 is a side elevation of my improved machine for making paper bags. Fig. 2 is a transverse vertical sectional view of the same on the line *x—x* of Fig. 1. Fig. 3 is a plan view of the machine. Fig. 4 is a longitudinal sectional view of the suction formers and their carriers with the former partly opened or separated. Fig. 5 is a similar view showing the suction formers fully opened or separated. Fig. 6 is a detail view of the devices for controlling the blower taken on the line *y—y* of Fig. 3. Fig. 7 is a sectional view of the stripping devices. Fig. 8 is a front elevation of the blower. Fig. 9 is a perspective view of the section formers and their carriers. Figs. 10, 11 and 12 are perspective detail views of the suction formers showing their different movements in forming the bottom of the bag; and Figs. 13, 14, 15 and 16 are perspective views of the paper tube illustrating successive steps in the formation of the bag bottom.

A is the frame of the machine.

B are guide frames upon the top of the frame A provided with suitable guideways $b$.

C C are two transversely arranged sliding carriers movable in the guideways $b$ and located one above the other. These carriers are separated slightly from one another to admit the tube sections between them, and are held together in their reciprocations by pins $a$ carried by one carrier and extending into a recess in the other. The upper carrier is provided with guide plates $c$ which fit over the guides $b'$ of the frame B and support and guide the carrier in its movements.

D are levers upon opposite sides of the machine connected at their upper ends by links $d$ with one of the carriers. The lower ends of the levers are journaled on a shaft $D'$ carried by brackets $D^2$.

E is a cross bar connecting the levers D.

E' is a link connecting the cross bar E with a crank $E^2$ on the driving shaft $e$.

F is the driving pulley.

The carriers C C are reciprocated back and forth in the frames B by the rocking levers D.

G is a feeding chute or funnel in the front of the machine through which the tube sections are fed between the carriers C C.

H, H, are the suction formers carried by the carriers C C. These suction formers each consist of two hollow box shaped sections $H'$, $H^2$ hinged together as at $h$ and provided with perforated faces $d'$, $d^2$. The sections $H^2$ are of less area than the sections $H'$ and are hinged as at $h'$ to the carriers C C.

I are flexible tubes connecting each of the sections of the formers H, H, with a suction flue J, in which suction is created by a fan or other suction creating device K (dotted lines in Fig. 1).

An intermittent or interrupted suction may be provided in the flue J by a damper $j$ in the flue connected with a lever $J'$ operated by a cam $j'$ on the shaft $e$.

During the reciprocation of the formers H, H, the sections $H'$ $H'$ and $H^2$ $H^2$ are caused to move apart or open and the paper of the tube section being held against the perforated faces of the formers by the suction from the flue J is drawn into the proper folds.

I shall now describe the mechanism by which the formers are opened. M, M, are two stationary cam arms carried by the frame B and located one above and one below the guideway $b$. L L are fingers carried by the former sections $H'$ $H'$ bearing respectively against the cam arms M M. These fingers L L are preferably provided with anti friction rollers $l$, $l$, running in contact with the arms M M. N N are a second pair of stationary cam arms arranged in front of the cam arms M M and similarly located with respect to the frame B. O O are fingers carried by the former sections $H^2$ $H^2$ and bearing respectively against the cam arms N N. These fingers may be provided with anti friction rollers $o$ $o$ to run in contact with the cams. $f$ are springs between the former sections $H'$ $H'$ and $H^2$ $H^2$ and a stationary part, such as the extensions $F'$ $F'$ of the cam arms N N, and hold the rollers $l$ $l$ and $o$ $o$ respectively in contact with the cam arms M, M, and N, N, so that during the reciprocation of the formers H, H, the fingers L, L, and O, O, follow the irregularities of the cam arms M, M, and N, N, and thus cause the former sections $H'$, $H'$ and $H^2$, $H^2$ to move apart or open for the purpose of forming the paper between them into the proper folds, as will be more fully described hereinafter.

It is apparent that the particular construction and arrangement of the cam mechanism for opening the suction formers may be varied in many ways. When the carriers C, C, and their formers H, H, are in a position to receive a tube section from the funnel G, as shown in Fig. 1, the adjacent faces of the carriers C, C, are brought together so as to clamp and hold the paper between the formers H, H. To accomplish this purpose I employ pivoted cam fingers P, P, located on each side of the machine near the front thereof and adapted to act upon the lower face of the lower carrier C to lift it. The under surface of the carrier may be notched or recessed slightly as shown at $c'$ to receive the fingers P. The fingers P are normally held upright by small springs $p$ bearing loosely upon the fingers. $p'$ are springs between the fingers P and the frame to return the fingers to an upright position when they have been moved.

Q, Q, are pawls pivoted to the upper carrier C and adapted to engage the lower carrier and hold it in a raised position after it has been lifted by the fingers P, P.

$q$, $q$, are springs acting on the pawls Q, Q, to press them in engagement with the lower carrier when the same is lifted.

The operation of the fingers P, P, and pawls Q, Q, is as follows: When the carriers C, C, are reciprocated the face of the lower carrier comes in contact with the fingers P, P, and swings them upon their pivots against the resistance of the springs $p$, $p$, at the same time riding over the fingers and being lifted by them. When the lower carrier is thus lifted, the pawls Q acted upon by the springs $q$ snap under the edge of the carrier and hold it in its lifted position. $Q'$, $Q'$ are cams upon each side of the frame B near the rear thereof, located in position to act upon the pawls Q, Q, when the carriers C, C, have reached substantially the limit of the reciprocation, to move them out of engagement with the lower carrier C and permit it to fall again to its lowest position. R, R, are wings hinged to brackets $R'$ $R'$ carried by the upper carrier C and located on each side adjacent to the formers H, H. These hinged wings R, R, are normally held in position by springs $r$, $r$. S, S, are springs carried by the frames B, B, adjacent to the rear thereof and projecting from each side into the space between the frames so as to act upon the hinged wings R, R, and close them down upon the faces of the formers when the same have been opened up. The action of these springs S, S, upon the wings R, R, is shown in Figs. 11 and 12. The wings are folded down upon the faces $d^2$, $d^2$, of the former sections $H^2$ $H^2$. When the carriers C, C, move back and the formers H, H, close together the wings R, R, are restored to their normal positions by the springs $r$, $r$. T is a blower located adjacent to the rear end of the machine opening to the space between the frames B, B, and may be provided with a slide or door $t$ to control the opening. $J^2$ is the blower flue connecting the blower T with the pressure side of the fan K. To obtain an intermittent blast from the blower T, I prefer to employ a damper $k$ in the flue $K^2$ provided with a lever $k'$ operated by a cam $k^2$ on the counter shaft $o'$. The counter shaft $e'$ is driven from the shaft $e^2$ through bevel gears $G'$ $G^2$, and the shaft $e^2$ may receive power from the shaft $e^3$ through suitable pulleys and a belt $I'$ (see dotted lines in Fig. 3). U, U, are stripping rollers carried by shafts $e^3$, $e^4$ located below the blower T. These rollers may be driven together by suitable gears $U'$, and power may be imparted to them in any convenient manner as by the belt $U^2$ between a pulley of the main shaft $e$ and the shaft $e^3$. V, V, are two stripping fingers carried upon a shaft $v$ located in front of the stripping rollers U, U. $V'$, $V'$, are two elliptical gears carried upon the shafts $v$ and $v'$, whereby the shafts and the stripping fingers V, V, carried thereby are driven at a varying speed. W is a driving chain by which the shaft $v'$ may be driven from the main shaft $e$ through suitable sprocket wheels on the respective shafts. The edge of the lower former section $H'$ is provided with notches $m$, $m$, through which the ends of the stripping fingers V V may pass, and these ends may be provided with spring nose pieces $m'$, $m'$.

Having described the general construction and arrangement of the parts of my machine, I shall now proceed to describe the operation of the same in forming the bottom on the tube sections. The tube sections are fed in succession through the chute or guide G in any convenient manner. A tube section thus fed passes between the carriers C, C, and formers H. When the carriers are reciprocated to the rear by levers D, the lower carrier by the action of the fingers P is lifted and locked by the pawls Q so as to clasp one end of the tube sections firmly between the adjacent faces of the carrier leaving the other portion free between the suction formers H, H. As the reciprocation of the carriers C, C, is continued, the formers H, H, are moved apart or opened up as has been heretofore described, and at the same time the suction in the formers causes the paper to adhere to the perforated faces. In Figs. 9, 10, and 4, are shown successive positions assumed by the former sections and in Figs. 13, 14, and 15 are shown corresponding successive shapes assumed by the end of the tube section under the action of the formers. The opening of the formers into the position shown in Fig. 10 draws apart the two faces of the paper and forms the transverse crease 1. As the reciprocation continues, the sections $H'$ and $H^2$ are opened out to a greater extent by the action of their respective cams, and the sections $H'$ assume an angular position with reference to the sections $H^2$ (this being permitted by the hinge connection $h$ between the two sections) and the second transverse creases 2 are formed. At the same time the bellows side folds are drawn partially open. The drawing open of the bellows side folds breaks the paper into the diamond side folds 3, 3, (Fig. 15) The former section $H'$ under the action of its cam now commences to open fully into a horizontal position at the same time fully opening up the sections $H^2$, and simultaneously the wings R, R, are folded in upon the former sections $H^2$, $H^2$. These movements of the formers draw out the faces of the tube into the same plane, at the same time extending the bellows side folds which the wings R R flatten down or fold over as shown in Fig. 16, completing the formation of the diamond side folds and side creases 4, 4. The bottom of the bag is now broken down into the shape shown in Fig. 16 with the projecting flaps 5, 5, formed by the slits made in the tube sections. During these forming operations, a blast of air is blown from the blower into the opened end of the bag section and assists in forcing the paper upon the former sections and in the formation of the proper creases and folds. The bag section thus folded is stripped from the formers and passes to the final pasting and folding devices which apply paste to the flaps 5, 5, and fold them down over on the creases 2, 2, making the completed bag. Before the tube is stripped off, however, the lower carrier C is allowed to fall from contact with the upper carrier so as to release the tube section clamped between them and permit it to be stripped off. This is accomplished by the action of the cams $Q'$ upon the pawls Q, as has been heretofore described.

It is immaterial to my invention what particular character of final pasting and folding devices are employed. Such devices as are shown and described in Letters Patent of the United States, No. 252,412, dated January 17, 1882, and No. 258,272, dated May 23, 1882, may be employed for this purpose.

The folded tubes may be stripped from the formers in any convenient manner. In the apparatus described I have shown for this purpose the stripping fingers V, V, rotated through the elliptical gears $V'$, $V'$. The ends of the stripping fingers pass through the notches $m, m$, in the end of the lower former section H' and carry the flap of paper to the stripping rollers U, U, by which the tube sections are carried from the formers and delivered to the final pasting and folding appliances heretofore referred to. By employing the elliptical gears V', V', for driving the stripping fingers V, V, the movement of the fingers is accelerated at the moment of acting upon the tube, and is then retarded in the act of delivering the tubes to the strippers. This insures a certain stripping of the tubes. By employing the spring noses $m'$ upon the stripping fingers V, the ends of the fingers are permitted to dwell longer upon the rollers U, U, in delivering the tubes, and a more certain feed is obtained. After the formed section has been stripped off, the formers are reciprocated back and receive another tube section which they form in the same manner as has been described.

The intermittent action of the suction through the perforated formers, and also of the blast from the blower T assists materially in breaking the paper into the proper folds. This intermittent suction or blast imparts a slight movement or vibration to the paper and thus acts better than a uniform maintained current to form the creases and folds.

What I claim as new, and desire to secure by Letters Patent, is—

1. In a paper bag machine, the combination of reciprocating suction formers by which the tube is carried and mechanism to move the formers apart during their reciprocation.

2. In a paper bag machine, the combination of reciprocating suction formers by which the tube is carried consisting of hinged sections.

3. In a paper bag machine, the combination of reciprocating frames, suction formers carried by the frames and movable with respect thereto, and mechanism to move said formers apart during their reciprocation with the frames.

4. In a paper bag machine, the combination of reciprocating suction formers between which the tube to be formed is carried, and cams to cause the said formers to move apart from one another during their reciprocation.

5. In a paper bag machine, the combination with a guide frame, of two reciprocating carriers, clamping devices to clamp the carriers together, suction formers carried by the carriers and reciprocating therewith, and cam devices to guide said formers apart during their reciprocation in the guide frame.

6. In a paper bag machine, the combination of reciprocating carriers, with the suction formers hinged thereto, each consisting of the two sections H', H² hinged together.

7. In a paper bag machine, the combination of reciprocating carriers, with the suction formers hinged thereto, each consisting of the two sections H', H² hinged together, and an independent cam device for each former section to guide it independently of the others during the reciprocation of the carrier.

8. In a paper bag machine, the combination of suction formers, a suction flue connected therewith, and an intermittently operated damper in the flue to produce an interrupted suction in the formers.

9. In a paper bag machine, the combination of a pair of reciprocating suction formers, cam devices to guide the suction formers apart during their reciprocation, whereby the paper tube is opened and partially formed, and movable side folding wings to fold in the sides of the paper tube.

10. In a paper bag machine, the combination with the reciprocating and expanding suction formers of the side folding wings R, R, and the springs S, S, to operate said wings.

11. In a paper bag machine, the combination of reciprocating suction formers, a suction flue, a suction creating device connected with the flue, and flexible tubes connecting the air flue and suction formers.

12. In a paper bag machine, the combination of the reciprocating carriers C, C, the suction formers H H, hinged thereto, the folding wings R, R, hinged to one of the carriers adjacent to the formers H, H, and on a transverse axis, the springs S, S, located in the path of the wings when the carriers are reciprocated and means to move the formers apart during the reciprocation thereof.

13. In a paper bag machine, the combination of reciprocating suction formers, means to move said formers apart during their reciprocation to open up the end of the tube, side folders to fold in the sides of the open end of the tube, and strippers to strip the folded tube from the formers.

14. In a paper bag machine, the combination of reciprocating suction formers, means to move said formers apart during their reciprocation to open up the end of the tube, side folders to fold in the sides of the open end of the tube, a blower to blow a blast of air between the formers.

15. In a paper bag machine, the combination of a pair of suction formers between which the end of the paper tube is formed, a suction flue connected with the former, a blower opening between said formers to blow a blast of air into the opened tube while it is being formed, and intermittently operated dampers, in the suction flue and blower to produce an interrupted suction and blast therein.

16. The combination with the suction formers of a paper bag machine of the stripping rollers, the stripping fingers, betweeen the rollers and formers, and elliptical gears to impart an accelerated and retarded rotation to the stripping fingers.

17. In a bag machine, the combination of reciprocating suction formers, cams to guide said formers apart during their reciprocation, projecting parts carried by the formers and running in contact with the cams, and springs to hold the projecting parts in contact with the cams.

18. In a paper bag machine, the combination of a pair of reciprocating carriers, suction formers carried thereby, means to move said suction formers apart during their reciprocation, and means to clamp said carriers together during their reciprocation.

19. In a paper bag machine, the combination of perforated suction formers, between which the end of the paper tube to be formed is received, consisting of hinged sections, and mechanism to move said formers apart from a substantially horizontal to a substantially vertical position.

20. In a paper bag machine, the combination of perforated suction formers, between which the end of the paper tube to be formed is received, consisting of hinged sections, and mechanism to move said formers apart and vary the angular relations of their sections.

In testimony of which invention I have hereunto set my hand.

WILLIAM B. PURVIS.

Witnesses:
ERNEST HOWARD HUNTER,
S. T. YERKES.